(12) United States Patent
Spertus

(10) Patent No.: US 8,201,224 B1
(45) Date of Patent: Jun. 12, 2012

(54) SYSTEMS AND METHODS FOR TEMPORARILY ADJUSTING CONTROL SETTINGS ON COMPUTING DEVICES

(75) Inventor: Michael Spertus, Wilmette, IL (US)

(73) Assignee: Symantec Corporation, Mountain View, CA (US)

(*) Notice: Subject to any disclaimer, the term of this patent is extended or adjusted under 35 U.S.C. 154(b) by 567 days.

(21) Appl. No.: 12/241,173

(22) Filed: Sep. 30, 2008

(51) Int. Cl.
H04L 29/06 (2006.01)

(52) U.S. Cl. ............................. 726/4; 713/153; 713/182

(58) Field of Classification Search .................... 726/4
See application file for complete search history.

(56) References Cited

U.S. PATENT DOCUMENTS

| | | | | |
|---|---|---|---|---|
| 7,103,663 | B2* | 9/2006 | Inoue et al. | 709/225 |
| 7,209,957 | B2* | 4/2007 | Patron et al. | 709/208 |
| 7,313,384 | B1* | 12/2007 | Meenan et al. | 455/410 |
| 7,653,379 | B1* | 1/2010 | Meenan et al. | 455/410 |
| 7,752,329 | B1* | 7/2010 | Meenan et al. | 709/232 |
| 7,797,735 | B2* | 9/2010 | Beilinson et al. | 726/4 |
| 7,818,789 | B2* | 10/2010 | Beilinson et al. | 726/4 |
| 7,853,535 | B2* | 12/2010 | Colella | 705/67 |
| 2002/0049806 | A1* | 4/2002 | Gatz et al. | 709/203 |
| 2003/0005135 | A1* | 1/2003 | Inoue et al. | 709/229 |
| 2003/0006135 | A1* | 1/2003 | Ban | 204/274 |
| 2003/0177353 | A1* | 9/2003 | Hiltgen | 713/161 |
| 2004/0003279 | A1* | 1/2004 | Beilinson et al. | 713/200 |
| 2004/0221303 | A1* | 11/2004 | Sie et al. | 725/29 |
| 2005/0060167 | A1* | 3/2005 | Patron et al. | 705/1 |
| 2005/0149737 | A1* | 7/2005 | Driscoll | 713/182 |
| 2005/0198319 | A1* | 9/2005 | Chan et al. | 709/228 |
| 2006/0242306 | A1* | 10/2006 | Boro et al. | 709/227 |
| 2007/0013515 | A1* | 1/2007 | Johnson et al. | 340/568.1 |
| 2008/0120693 | A1* | 5/2008 | Beilinson et al. | 726/1 |
| 2008/0141293 | A1* | 6/2008 | Blanchard et al. | 725/28 |
| 2008/0155685 | A1* | 6/2008 | Beilinson et al. | 726/21 |
| 2008/0307339 | A1* | 12/2008 | Boro et al. | 715/764 |
| 2009/0064302 | A1* | 3/2009 | Colella | 726/9 |
| 2009/0254656 | A1* | 10/2009 | Vignisson et al. | 709/224 |
| 2010/0105481 | A2* | 4/2010 | Hogan et al. | 463/42 |

* cited by examiner

*Primary Examiner* — Oscar Louie
(74) *Attorney, Agent, or Firm* — Advantedge Law Group

(57) ABSTRACT

A computer-implemented method for temporarily adjusting control settings on computing devices. The method may comprise: 1) receiving a set of permissions for adjusting a set of control settings on a computing device, 2) identifying the set of control settings to be adjusted, and then 3) temporarily adjusting, based on the set of permissions, the set of control settings. The method may further comprise saving a base state of the set of control settings and restoring the set of control settings to the base state. Corresponding systems and computer-readable media are also disclosed.

18 Claims, 6 Drawing Sheets

SYSTEMS AND METHODS FOR TEMPORARILY ADJUSTING CONTROL SETTINGS ON COMPUTING DEVICES

BACKGROUND

Computing devices incorporate administrator controls for a variety of reasons. For example, administrator controls may prevent users from viewing inappropriate content and/or may prevent excessive usage. Many parents implement administrator controls to limit their children's computer-based activities, such as video gaming or browsing the Internet. Unfortunately, these restrictions may not allow children enough computer time for non-recreational activities, such as homework assignments or projects.

In certain situations, parents may rely on trust to gauge whether their children genuinely need additional privileges. For example, a teacher may assign a student to write a research paper on hate speech, but the administrator controls on the student's home computer may block internet content associated with hate speech. The student may inform a parent of the assignment and request that the parent lift restrictions on the computer to enable the student to properly research the topic online. However, the parent may be unable to confirm the truth of the student's claim. Furthermore, if the parent decides that the student should have extended rights for completing the project, the parent may have to manually adjust the control settings on the home computer and may need to remember to readjust the control settings once the project is completed.

What is needed, therefore, is a more effective way to adjust administrator controls.

SUMMARY

As will be described in greater detail below, the instant disclosure generally relates to systems and methods for temporarily adjusting administrator-control settings, such as parental-control settings, on computing devices. In some embodiments, a method for temporarily adjusting administrator-control settings may comprise receiving a set of permissions for adjusting a set of administrator-control settings on a computing device. For example, a permissions module on a student's home computer may receive a set of permissions from a teacher. The set of permissions may correspond to an internet research project assigned to the student.

After receiving the set of permissions, an administrator-controls module may identify the set of administrator-control settings to be adjusted. For example, the administrator-controls module may determine that the set of permissions includes an internet-use time limit and may identify a parental-control setting that limits how long the student may use the internet. The administrator-controls module may then use the set of permissions to temporarily adjust the set of administrator-control settings. In the student-teacher example mentioned above, the administrator-controls module may use the internet-use time limit from the teacher to adjust a time limit set by a parent.

In some embodiments, the administrator-controls module may display the set of administrator-control settings in human-readable form to inform a user of restrictions defined by the administrator-control settings. Restrictions defined by administrator-control settings may limit the user's access to content, software applications, files, communications (instant-messaging, voice, email, etc.), or any other computer resources or data. Restrictions displayed in human-readable form may emphasize at least a portion of the set of administrator-control settings to draw the user's attention to one or more restrictions.

In at least one embodiment, the administrator-controls module may save a base state (i.e., original state) of the set of administrator-control settings. The administrator-controls module may restore the administrator-control settings to the base state at a later time. For example, the set of permissions may be associated with a limiting condition, such as a time limit. When the limiting condition is satisfied, the administrator-controls module may restore the set of administrator-control settings to the base state (e.g., the administrator-controls module may change the administrator-control settings from permissions associated with the received set of permissions to permissions associated with the base state).

According to various embodiments, a history-of-activity module may record a history of activity on the computing device. The history of activity may detail activity (e.g., internet use) on the computing device for the time period in which the administrator-control settings are adjusted in accordance with the received set of permissions. The history-of-activity module may display the history of activity in human-readable form. The history-of-activity module may also transmit the history of activity to an additional computing device and/or save the history of activity to a storage device. The history of activity may provide information to a user of the computing device or to a third party (e.g., a teacher).

The present disclosure also sets forth a method for distributing sets of permissions to adjust administrator-control settings. A permissions module on a first computing device (e.g., a teacher's computing device) may receive permissions information. For example, a teacher may enter permissions information on a computing device to generate a set of permissions. The set of permissions may be configured to adjust a parental-control setting on a second computing device (e.g., a student's home computing device). The teacher may also enter permissions information to define a limiting condition (e.g., a time limit) for the set of permissions.

After generating the set of permissions, the permissions module on the first computing device may send the set of permissions to the second computing device. For example, the teacher may transmit the set of permissions to the student's home computing device via the Internet. As described above, a permissions module on the student's home computing device may receive the set of permissions, and an administrator-controls module may use the set of permissions to temporarily adjust a set of administrator-control settings (e.g., parental-control settings).

In certain embodiments, the first computing device may also receive a history of activity from the second computing device. For example, the teacher's computing device may receive a report detailing activity on the student's home computing device. The report may indicate websites visited, content viewed, files accessed, software used, and/or any other information about activity on the student's home computing device. After reception, the teacher's computing device may display the history of activity in a human-readable form. In one example, the teacher may require a history of activity so the teacher may be able to examine the student's researching methods and verify that the student used a sufficient variety of sources for a class project.

As will be explained below, the systems and methods disclosed herein may enable teachers to automatically adjust administrator-control settings on students' home computers. In doing so, students may receive more freedom to complete assignments without requiring parents to manually change administrator-control settings. At the same time, parents may have peace of mind knowing that teachers are determining which administrator-control settings to temporarily adjust for students' assignments. In addition, teachers may be able to confirm that a student's research was adequate, better evaluate a student's research skills, and/or check more easily for plagiarism.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
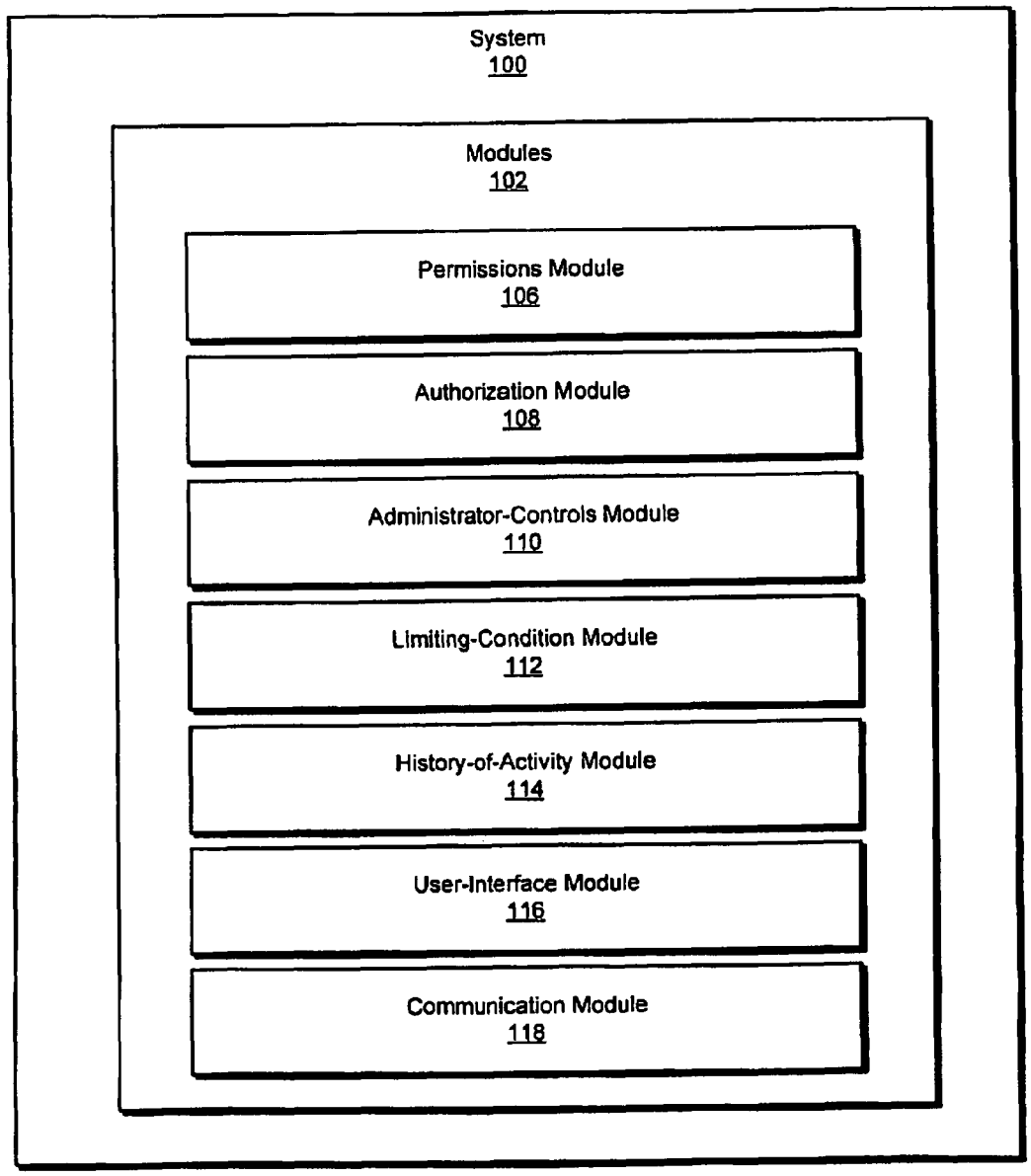
FIG. 1 is a block diagram of an exemplary system for temporarily adjusting administrator-control settings according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure relates generally to systems and methods for temporarily adjusting administrator-control settings on computing devices. The phrase "administrator-control settings," as used herein, generally refers to options in any operating system or software application that control access to features such as content, software, files, communications, or any other computer resources or data. For example, administrator-control settings in a web browser may prevent a child user from viewing adult content on the Internet. The phrase "parental-control settings," as used herein, generally refers to any administrator-control settings that a parent or other guardian uses to control a child's use of a computing device.

Figure 2:
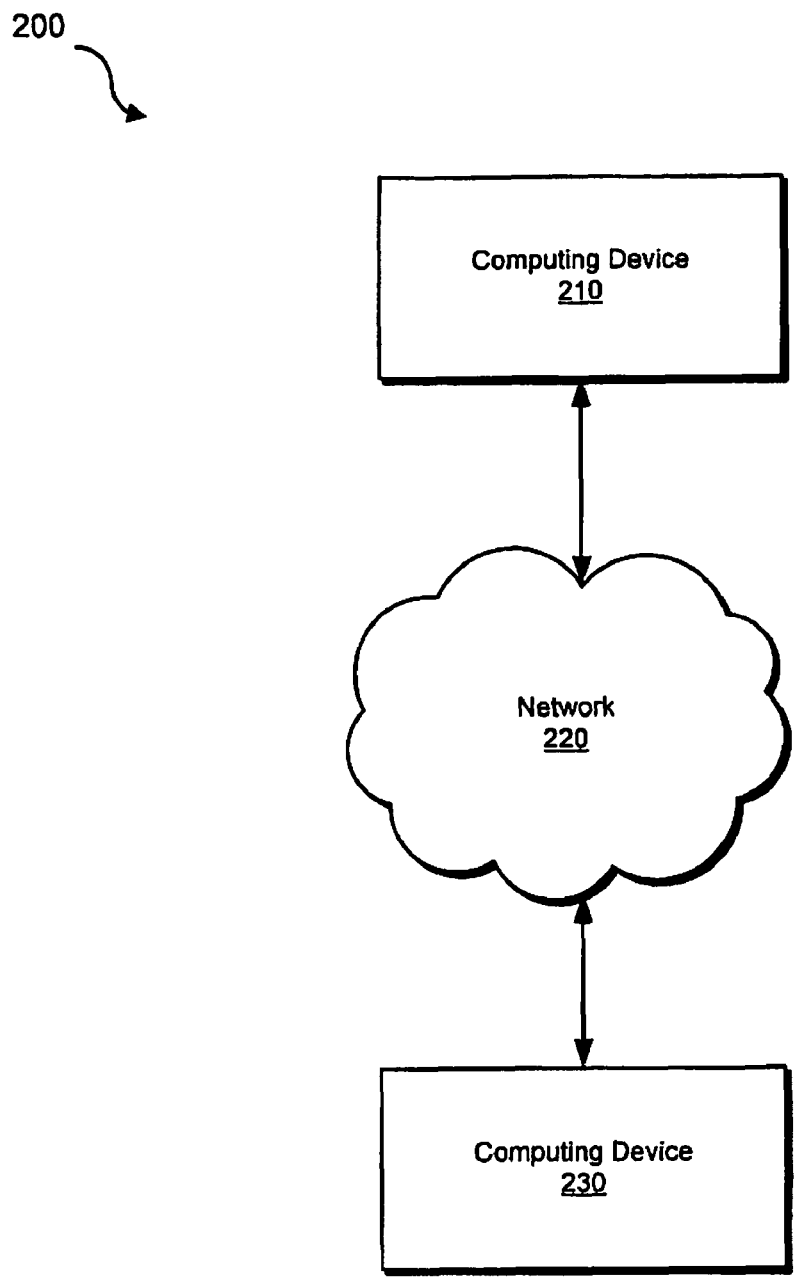
FIG. 2 is a block diagram of an additional exemplary system for temporarily adjusting administrator-control settings according to at least one embodiment.

The following will provide, with reference to FIGS. 1 and 2, detailed descriptions of exemplary systems for temporarily adjusting administrator-control settings on computing devices. Descriptions of an exemplary computing system and an exemplary network architecture capable of implementing one or more of the embodiments described and/or illustrated herein will also be provided in connection with FIGS. 5 and 6. In addition, detailed descriptions of corresponding exemplary computer-implemented methods will be provided in connection with FIGS. 3 and 4.

FIG. 1 is a block diagram of an exemplary system 100 for temporarily adjusting administrator-control settings on computing devices. As illustrated in FIG. 1, exemplary system 100 may comprise one or more modules 102 for performing one or more tasks. For example, exemplary system 100 may comprise a permissions module 106 for generating sets of permissions and an authorization module 108 for detecting, identifying, and/or authorizing sets of permissions. Exemplary system 100 in FIG. 1 may also comprise an administrator-controls module 110 for identifying, saving, temporarily adjusting, and/or restoring the administrator-control settings.

As illustrated in FIG. 1, exemplary system 100 may also comprise a limiting-condition module 112 for creating limiting conditions for sets of permissions and determining when the limiting conditions are satisfied. Further, exemplary system 100 may comprise a history-of-activity module 114 for recording internet and/or other activity on a computing device. Exemplary system 100 may also comprise a user-interface module 116 for managing input and output functions of computing devices. In addition, a communication module 118 may facilitate communication within and/or between computing devices.

In certain embodiments, one or more of modules 102 in FIG. 1 may represent one or more software applications or programs that, when executed by a computing device, may cause the computing device to perform one or more tasks required to temporarily adjust administrator-control settings on computing devices. For example, as will be described in greater detail below, one or more of modules 102 may represent software modules configured to run on one or more computing devices, such as the devices of system 200 in FIG. 2 (e.g., computing device 210 and computing device 230), computing system 510 in FIG. 5, and/or portions of exemplary network architecture 600 in FIG. 6. One or more modules 102 in FIG. 1 may also represent all or portions of one or more special-purpose computers configured to perform one or more tasks required to temporarily adjust administrator-control settings on computing devices.

FIG. 2 is a block diagram of an exemplary system 200 for temporarily adjusting administrator-control settings. As illustrated in FIG. 2, exemplary system 200 may comprise at least one computing device 210 and at least one computing device 230. The phrase "computing device," as used herein, generally refers to any electrical device capable of computing (i.e., comprising a central processing unit). Examples of computing devices include, without limitation, computers, laptops, desktops, cellular phones, personal digital assistants (PDAs), multimedia players, combinations of computing devices, or any other suitable computing device.

In certain embodiments, computing device 210 and/or computing device 230 may comprise one or more portions of exemplary system 100 in FIG. 1. For example, one or more of modules 102 in FIG. 1 may be stored and configured to run on computing device 210 and/or computing device 230. Computing devices 210 and 230 may also comprise various operating systems, software applications, and/or user interfaces, which are not illustrated in FIG. 2 nor described herein.

Furthermore, both computing devices 210 and 230 may be referred to herein as additional computing devices for the purpose of differentiation.

In various embodiments, computing device 210 may communicate with computing device 230 via network 220. The term "network," as used herein, generally refers to any medium facilitating communication or data transfer between devices. Examples of networks include, without limitation, an intranet, a wide area network (WAN), a local area network (LAN), a personal area network (PAN), power line communications (PLC), or the Internet. Furthermore, network 220 may facilitate any type of communication or data transfer via wireless or wired connections.

Figure 3:
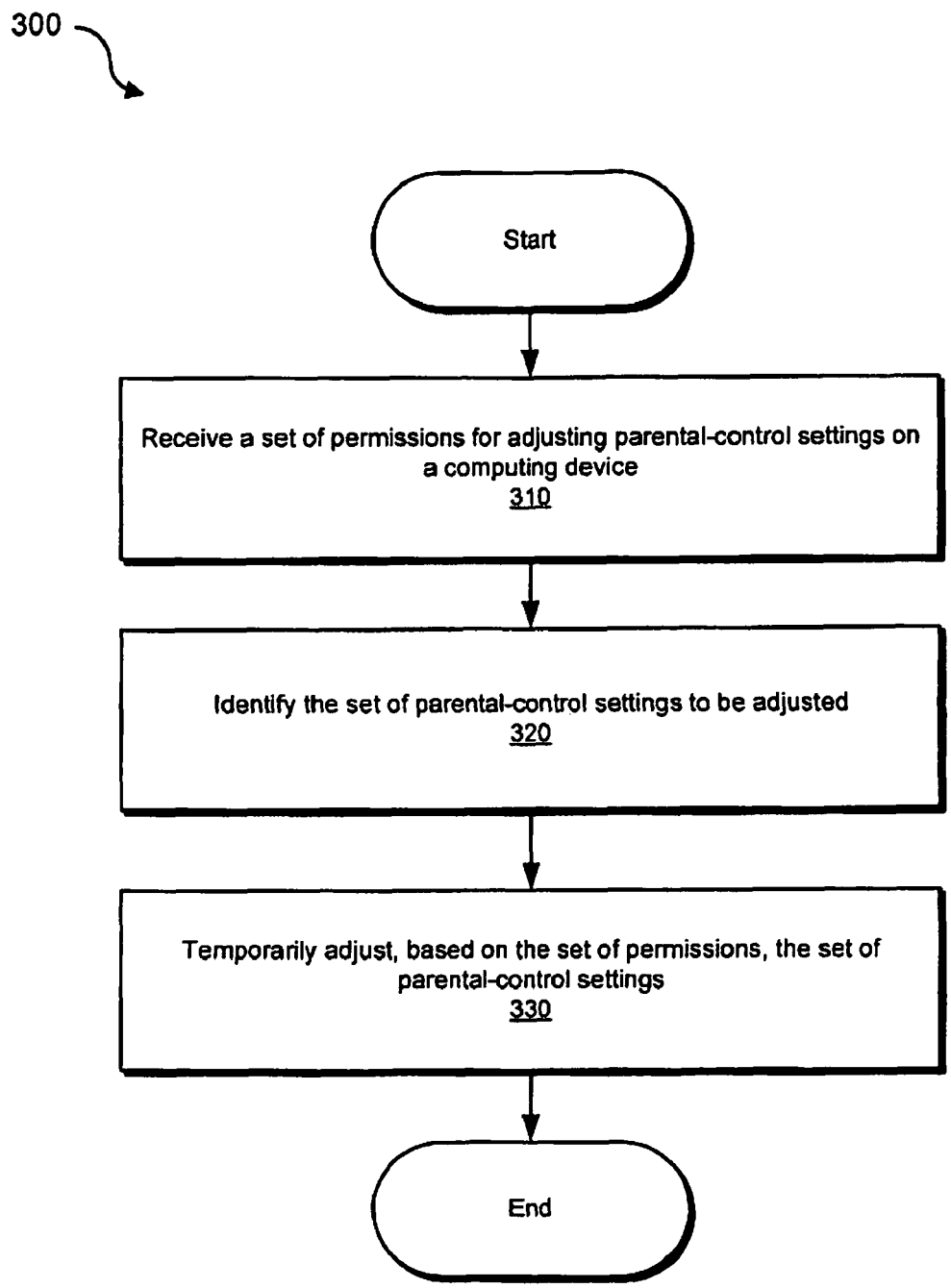
FIG. 3 is a flow diagram of an exemplary computer-implemented method for temporarily adjusting parental-control settings according to at least one embodiment.

FIG. 3 is a flow diagram of an exemplary computer-implemented method 300 for temporarily adjusting parental-control settings. As illustrated in this figure, at step 310, a set of permissions for temporarily adjusting a set of parental-control settings may be received. For example, computing device 210 may receive a set of permissions from computing device 230. In at least one embodiment, a student may use the computing device that receives the set of permissions. For example, a student may use computing device 210, which receives the set of permissions from computing device 230. In this example, a teacher may have generated the set of permissions on computing device 230. The set of permissions may comprise a single permission or any number of permissions for adjusting a set of administrator-control settings.

Step 310 may be performed in a variety of ways. For example, computing device 210 may receive the set of permissions via network 220 from computing device 230. Alternatively, computing device 210 may download the set of permissions from a portable storage device. Examples of portable storage devices include, without limitation, flash memories (e.g., USB flash drives), floppy disks, RAMs (e.g., DRAMs, SRAMs), ROMs (e.g., CD-ROMs, EPROMs), ZIP drives, or any other type of portable storage device.

At step 320, a set of parental-control settings may be identified based on the set of permissions received in step 310. For example, administrator-controls module 110 in FIG. 1, which may be installed on computing device 210, may identify a set of parental-control settings to adjust. The set of parental-control settings may be administrator-control settings that control access to various features, such as content, software applications, files, communications, websites, or any other computer resource or data. In at least one embodiment, the parental-control settings may comprise privacy settings of an operating system such as Microsoft Windows, Mac OS X, Linux, or Solaris. In some embodiments, the parental-control settings may comprise security settings in a web browser or parental-control settings in parental-control software. The set of parental-control settings may comprise a single administrator-control setting or any number of administrator-control settings.

At step 330, the set of parental-control settings identified in step 320 may be temporarily adjusted. For example, administrator-controls module 110 may temporarily adjust the set of parental-control settings based on the set of permissions. The term "temporarily," as used herein, generally refers to adjusting administrator-control settings, such as the parent-control settings, for a finite period of time, not permanently.

Furthermore, in certain embodiments, the computing device may temporarily adjust the set of parental-control settings automatically (i.e., without human intervention). In other embodiments, a user (i.e., a human) may provide input in the process of adjusting the set of parental-control settings. For example, a parent may provide input to authorize the set of permissions for temporarily adjusting the set of parental-control settings.

After temporarily adjusting the parental-control settings, the computing device may allow a user to access previously restricted content, software applications, files, communications, or any other computer resource. For example, a student may access previously restricted content associated with hate speech on computing device 210. Parental-control settings may also be adjusted to give a student extended or additional rights to use instant messaging and/or voice communications (e.g., cellular phone, VOIP, etc.) to collaborate with other students.

In one example, the set of permissions may be received from a school and may be associated with a third-grade child. The set of permissions may allow a child to access previously restricted content, allow the child to use a previously restricted software application (e.g., a software application that the child is not typically allowed to use or is only allowed to use for a limited period of time), or may allow the child to communicate with another computing device (e.g., via instant-messaging). The set of permissions may also allow the child to have extended privileges for using instant messaging, provide the child with additional time for using a restricted software application, and/or provide the child with additional time for voice communications.

Although not illustrated in FIG. 3, exemplary method 330 may comprise additional steps, such as saving a base state of the set of parental-control settings. The step of saving a base state may be performed prior to step 330 or at any other suitable time. For example, administrator-controls module 110, which may be installed on computing device 210, may save a base state of the set of parental-control settings prior to temporarily adjusting the settings. The base state may be a set of permissions that represents the configuration of the set of parental-control settings before administrator-controls module 110 adjusts the set of parental-control settings in step 330. The computing device may save the base state to an internal storage device or to a portable storage device. The computing device may use the base state to restore the parental-control settings at a later point in time. In other embodiments, the computing device may restore the parental-control settings to a default state after temporarily adjusting the parental-control settings. In such embodiments, the computing device may not need to store a base state to restore the parental-control settings.

In order to temporarily adjust the set of parental-control settings, the set of permissions may need to be authorized. For example, authorization module 108 in FIG. 1, which may be installed on computing device 210, may authorize the set of permissions prior to temporarily adjusting the set of parental-control settings. The computing device may prevent adjusting the set of parental-control settings if the set of permissions is not authorized. The term "authorize," as used herein, generally refers to confirming that a set of permissions was generated and/or distributed by an authorized source (i.e., a computing device or a user permitted to automatically adjust the administrator-control settings).

Authorization module 108 may authorize the set of permissions in several ways. In one example, authorization module 108 may verify that computing device 230, from which the set of permissions was received, or a user, has permission to temporarily adjust the set of parental-control settings on computing device 210. If either computing device 230 or a user on computing device 230 has permission, computing device 230 may use the set of permissions to temporarily adjust the set of parental-control settings. If not, the set of parental-control settings may remain unchanged.

In an additional example, authorization module 108 may query an administrator (e.g., a parent) whether to authorize the set of permissions for adjusting the set of parental-control settings on computing device 210. If the administrator authorizes the set of permissions, the computing device may automatically adjust the set of parental-control settings. However, if the administrator does not authorize the set of permissions, the set of parental-control settings may remain unchanged.

In some embodiments, authorization module 108 may receive digital authentication for the set of permissions. The digital authentication may be received with the set of permissions. For example, a school may send a digital signature with the set of permissions, and authorization module 108 may use the digital signature to verify that the set of permissions comes from a source authorized to temporarily change the parental-control settings. In other embodiments, any other digital authentication mechanism may be used to authenticate the set of permissions.

In at least one embodiment, a limiting condition for the set of permissions may be identified. For example, limiting condition module 112 in FIG. 1, which may be installed on computing device 210, may identify a limiting condition on computing device 210. Examples of limiting conditions include, without limitation, time limits, number limits (e.g., the number of websites visited), or any other limiting condition. When satisfied, the limiting condition may prompt the computing device to restore the set of parental-control settings to the base state. In addition, a user (e.g., a parent or a student) may terminate the set of permissions manually at any time, thereby causing the computing device to restore the set of parental-control settings to the base state.

On the computing device, the parental-control settings may already impose a predefined time limit for using certain software applications or communications. In these situations, administrator-controls module 110 may extend the predefined time limit. For example, administrator-controls module 110 may extend a predefined time limit for browsing the web or instant messaging.

The set of parental-control settings may be displayed for a user. For example, user-interface module 116 in FIG. 1, which may be installed on computing device 210, may display the parental-control settings for a student to view in a human-readable form. In doing so, the computing device may inform the student of restrictions limiting computer-based activity. As mentioned above, restrictions may limit access to content, software applications, files, communications, or any other computer resource or data. In some embodiments, user-interface module 116 may also emphasize at least a portion of the set of parental-control settings in the human-readable display. Examples of emphasizing may include, without limitation, highlighting, augmenting, capitalizing, categorizing, isolating, illuminating, or the like.

In various embodiments, a history of activity may be recorded for the time period in which the parental-control settings are adjusted in accordance with the received set of permissions or until the limiting condition is satisfied. For example, history-of-activity module 114 in FIG. 1, which may be installed on computing device 210, may record a history the activity on computing device 210. The history of activity may indicate websites visited, content viewed, files accessed, software used, communications with additional computing devices or individuals, or any other activity on the computing device. When the limiting condition is satisfied, the history of activity may cease to update.

The history of activity may be transferred to an additional computing device, which may occur in multiple ways. For example, communication module 118 in FIG. 1, which may be installed on computing device 210, may transmit the history of activity to computing device 230 via network 220. Computing device 210 may also save the history of activity to a portable storage device. After receiving the history of activity, the additional computing device (e.g., computing device 230) may display the history of activity for a user (e.g., a teacher) to view in a human-readable form.

In addition, the history of activity may be transferred to the additional computing device for various reasons. In one example, a teacher operating computing device 230 may require documentation concerning research conducted by a student operating computing device 210. More specifically, the teacher may view the history of activity to determine the number and/or reputability of the sources used by the student. The history of activity may also allow the teacher to more easily check for plagiarism.

Figure 4:
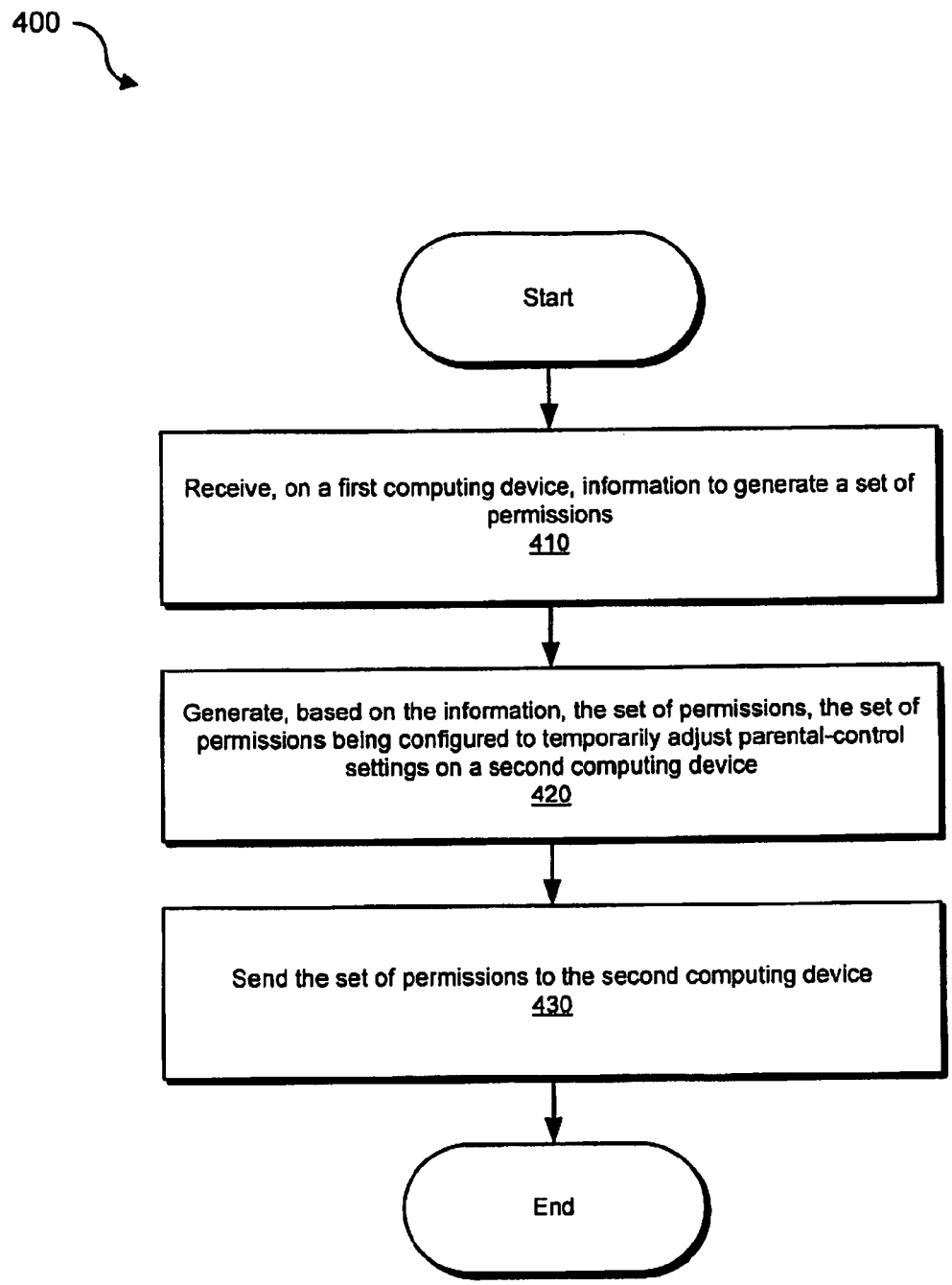
FIG. 4 is a flow diagram of an exemplary computer-implemented method for distributing sets of permissions to temporarily adjust parental-control settings according to at least one embodiment.

FIG. 4 is a flow diagram of exemplary computer-implemented method 400 for distributing sets of permissions to adjust parental-control settings. As illustrated in this figure, at step 410, permissions information may be received on a first computing device to generate a set of permissions. For example, computing device 230 may receive information from a teacher to generate a set of permissions. The phrase "permissions information," as used herein, generally refers to information used to define a set of permissions. In one example, permissions information may define the set of permissions to allow a student access to internet for an extended period of time for a large research project.

Step 410 may be performed in a variety of ways. In one example, a teacher may provide the permissions information via a user interface on computing device 230. In addition, the computing device may download the permissions information from a storage device, a website, or even an additional computing device.

At step 420, a set of permissions is generated to temporarily adjust administrator-control settings on a second computing device. For example, permissions module 106, which may be installed on computing device 230, may generate a set of permissions based on the permissions information received in step 410. The set of permissions may be configured to adjust parental-control settings on a second device (e.g., computing device 210). The set of permissions may be configured to adjust parental-control settings by being configured in a universal or widely-recognized format, by being configured in any format recognized by the recipient's device, by being sent with code programmed to use the permissions to adjust parental-control settings, or by any other suitable mechanism.

At step 430, the set of permissions generated in step 420 may be sent to the second computing device. In one example, communication module 118, which may be installed on computing device 230, may send the set of permissions to computing device 210 via network 220. In an alternative example, computing device 230 may save the set of permissions to a portable storage device. Any type of portable storage device, including those mentioned above, may store the set of permissions for uploading onto the second computing device. Upon completing step 430, exemplary method 400 may terminate.

Although not illustrated in FIG. 4, exemplary method 400 may also comprise further steps, such as sending a limiting condition for the set of permissions to the second computing device. For example, communication module 118 may send a limiting condition for the set of permissions to computing device 210 via network 220. As mentioned above, examples of limiting conditions include, without limitation, time limits, number limits (e.g., the number of websites visited), or any other limiting condition for the set of permissions.

In addition, a software module may be included with the set of permissions. For example, permissions module 106, which may be installed on computing device 230, may include a software module with the set of permissions sent to computing device 210 in step 430. After receiving the set of permissions, the second computing device (e.g., computing device 210) may use the software module included with the set of permissions to temporarily adjust the set of parental-control settings.

In at least one embodiment, a history of activity may be received on the first computing device. For example, computing device 230 may receive a history of activity detailing activity on computing device 210. The history of activity may indicate websites visited, content viewed, files accessed, software used, communication with additional computing devices, or any other information about computer-based activity on the second computing device.

The history of activity may be transferred in various ways. For example, communication module 118 may send the history of activity to computing device 230 via network 220. In addition, computing device 230 may download the history of activity from a portable storage device. After the transfer, user-interface module 116, which may be installed on computing device 230, may display the history of activity as a report.

The systems and methods described herein may temporarily adjust parental-control settings and various other types of administrator-control settings on computing devices. As expressed in one example above, a teacher may generate and send a set of permissions to a student's home computer for a school assignment (e.g., homework, projects, etc.). In another example, an information technology specialist may generate and send a set of permissions to an employee's work computer. The employee's work computer may use the set of permissions to temporarily adjust a set of parental-control settings. In this example, the employee may require additional internet access to research problems associated with pornography as part of a work assignment.

In a further example, an information technology specialist or a school administrator (e.g., a principal) may generate and send a set of permissions to a school computer. The school computer may employ the set of permissions to temporarily adjust a set of administrator-control settings, thereby granting a student internet access to restricted content. In this example, a student may need to use the school computer to research sexually transmitted diseases for a health class.

Figure 5:
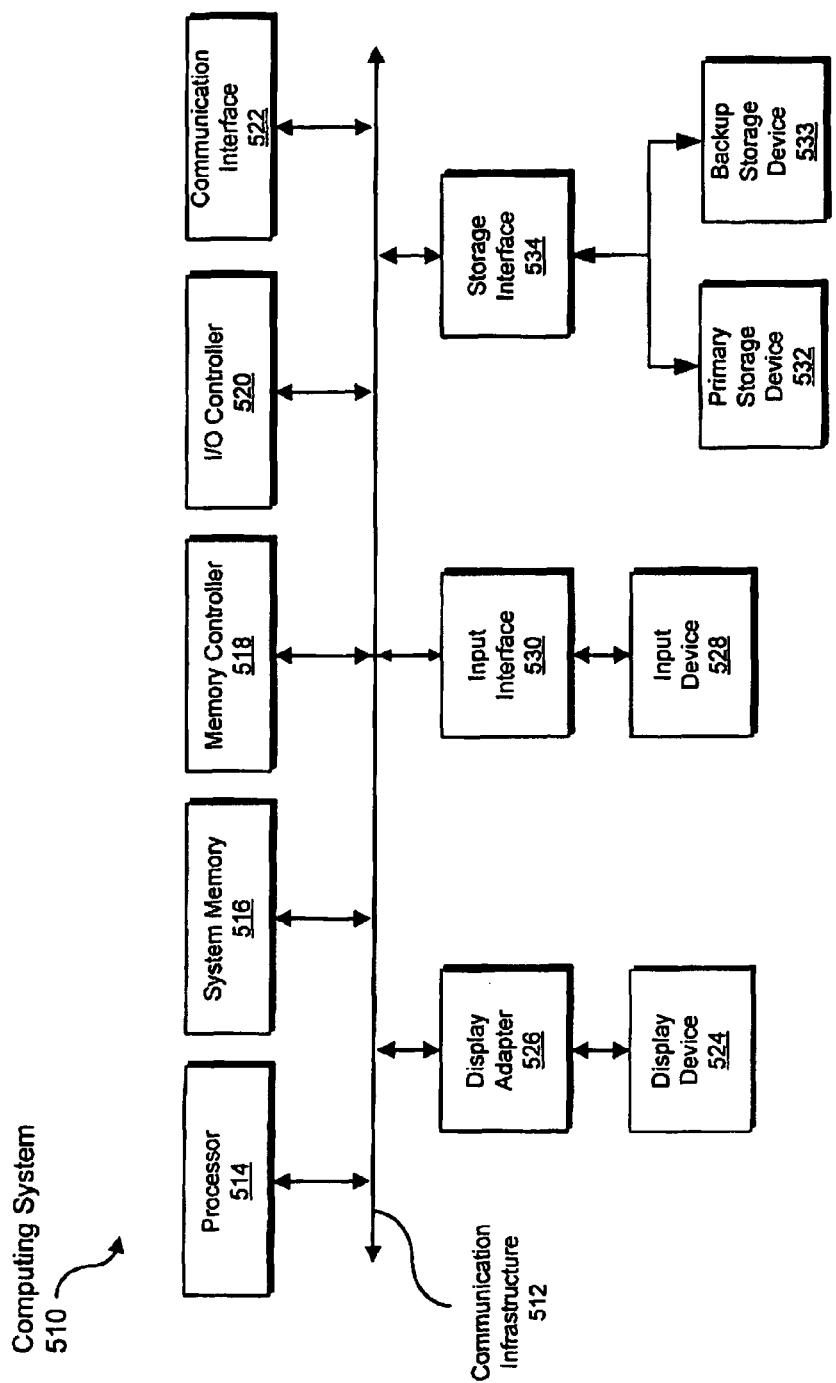
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may comprise at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the receiving, identifying, saving, temporarily adjusting, tracking, restoring, determining, recording, displaying, transmitting, emphasizing, extending, allowing, generating, sending, including, and querying steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may comprise both a volatile memory unit (such as, for example, system memory 516) and a non-volatile storage device (such as, for example, primary storage device 532, as described in detail below).

In certain embodiments, exemplary computing system 510 may also comprise one or more components or elements in addition to processor 514 and system memory 516. For example, as illustrated in FIG. 5, computing system 510 may comprise a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as receiving, identifying, saving, temporarily adjusting, tracking, restoring, determining, recording, displaying, transmitting, emphasizing, extending, allowing, generating, sending, including, and/or querying.

I/O controller 520 generally represents any type or form of module capable of coordinating and/or controlling the input and output functions of a computing device. For example, in certain embodiments I/O controller may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the receiving, identifying, saving, temporarily adjusting, tracking, restoring, determining, recording, displaying, transmitting, emphasizing, extending, allowing, generating, sending, including, and querying steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network comprising additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 594 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the receiving, identifying, saving, temporarily adjusting, tracking, restoring, determining, recording, displaying, transmitting, emphasizing, extending, allowing, generating, sending, including, and querying steps disclosed herein. Communication interface 522 may also be used to perform and/or be a means for performing other steps and features set forth in the instant disclosure.

As illustrated in FIG. 5, computing system 510 may also comprise at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also comprise at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the receiving, identifying, saving, temporarily adjusting, tracking, restoring, determining, recording, displaying, transmitting, emphasizing, extending, allowing, generating, sending, including, and querying steps disclosed herein. Input device 528 may also be used to perform and/or be a means for performing other steps and features set forth in the instant disclosure.

As illustrated in FIG. 5, exemplary computing system 510 may also comprise a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also comprise other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, the exemplary file systems disclosed herein may be stored on primary storage device 532, while the exemplary file-system backups disclosed herein may be stored on backup storage device 533. Storage devices 532 and 533 may also be used, for example, to perform and/or be a means for performing, either alone or in combination with other elements, one or more of the receiving, identifying, saving, temporarily adjusting, tracking, restoring, determining, recording, displaying, transmitting, emphasizing, extending, allowing, generating, sending, including, and querying steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
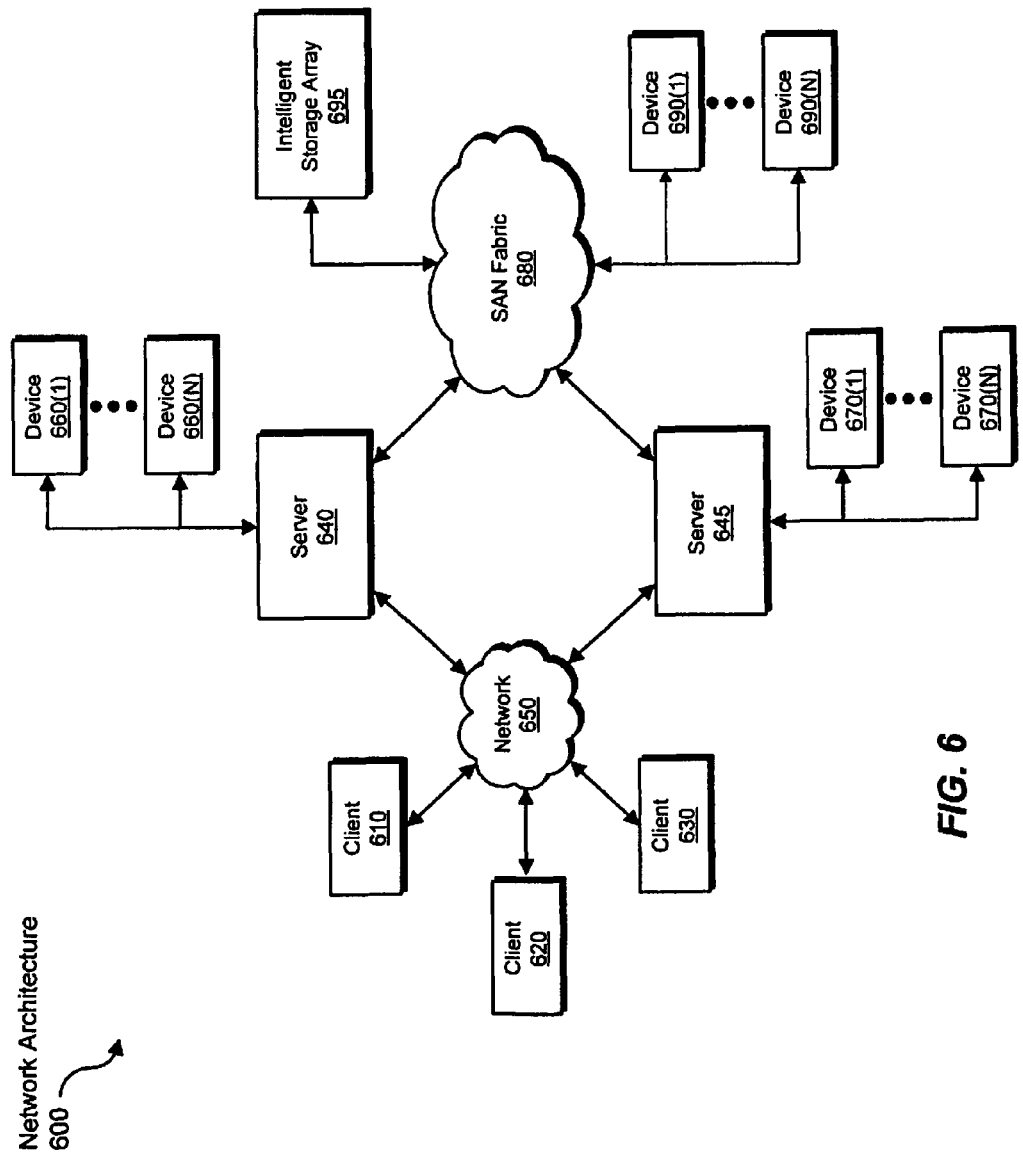
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or to run certain software applications. Network 650 generally represents any telecommunication or computer network; including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the receiving, identifying, saving, temporarily adjusting, tracking, restoring, determining, recording, displaying, transmitting, emphasizing, extending, allowing, generating, sending, including, and querying steps disclosed herein. Network architecture 600 may also be used to perform and/or be a means for performing other steps and features set forth in the instant disclosure.

As detailed above, computing system 510 and/or one or more of the components of network architecture 600 may perform and/or be a means for performing, either alone or in combination with other elements, one or more steps of the exemplary methods described and/or illustrated herein. For example, a computer-implemented method for temporarily adjusting administrator-control settings, such as parental-control settings, may comprise: 1) receiving a set of permissions for adjusting a set of administrator-control settings on a computing device, 2) identifying the set of administrator-control settings to be adjusted, and then 3) temporarily adjusting, based on the set of permissions, the set of administrator-control settings.

In certain embodiments, the method may further comprise saving a base state of the set of administrator-control settings prior to adjusting the settings. The base state may comprise a default or customized state of the set of administrator-control settings. After having saved the base state, the method may also comprise restoring the set of administrator-control settings to the base state. In other embodiments, the method may comprise restoring the set of administrator-control settings to a default state. According to various embodiments, the method may comprise identifying a limiting condition for the set of permissions and determining when the limiting condition is satisfied. In one embodiment, satisfying the limiting condition may induce the computing device to restore the set of administrator-control settings to the base state.

In at least one embodiment, the method may comprise recording a history of activity until the limiting condition is satisfied. The history of activity may correspond to the activity on the computing device. In addition, the computing device may display the history of activity in a human-readable form, transmit the history of activity to an additional computing device, and/or save the history of activity to a storage device.

In some embodiments, the method may further comprise displaying the set of administrator-control settings in a human-readable form to inform a user of any restrictions. The computing device may also emphasize at least a portion of the set of administrator-control settings in the human-readable form to attract the user's attention.

In addition, receiving the set of permissions may comprise receiving the set of permissions from an authorized source. In at least one embodiment, the computing device may authorize the source by querying an administrator after receiving the set of permissions. Alternatively, the authorized source may have been authorized prior to receiving the set of permissions.

Temporarily adjusting the set of administrator-control settings may comprise allowing temporary access of restricted content, allowing temporary use of a restricted software application, and/or allowing temporary communication between the computing device and additional computing devices. In certain embodiments, temporarily adjusting the set of administrator-control settings may also comprise extending a predefined time limit for using a restricted software application and/or extending a predefined time limit for communication between the computing device and an additional computing device. Temporarily adjusting the set of administrator-control settings may also comprise extending a predefined time limit or allowing temporary use of instant messaging or voice communications. In one embodiment, a student may use the computing device, and the computing device may receive the set of permissions from a teacher's computing device.

In some embodiments, the administrator-control settings may be parental-control settings and the set of permissions may be received from a school. The set of permissions may be configured to adjust at least one restriction on how the child is able to use the computing device.

According to various embodiments, temporarily adjusting the set of administrator-control settings may comprise at least one of allowing a child access to previously restricted content, allowing the child to use a previously restricted software application, and/or allowing communication between the computing device and an additional computing device. In some embodiments, temporarily adjusting the set of parental-control settings comprises providing a child with extended privileges for using instant messaging. According to certain embodiments, temporarily adjusting the set of administrator-control settings may comprise providing a child with additional time for using a restricted software application and/or providing a child with additional time for voice communications. In some embodiments, temporarily adjusting the set of parental-control settings may comprise providing a child with additional time for accessing the internet.

A method for distributing sets of permissions to adjust administrator-control settings may comprise: 1) receiving, on a first computing device, permissions information, 2) generating, based on the permissions information, a set of permissions configured to temporarily adjust a set of administrator-control settings on a second computing device, and then 3) sending the set of permissions to a second computing device. In some examples, the first computing device may include a software module with the set of permissions to temporarily adjust the set of administrator-control settings on the second computing device.

In at least one embodiment, the first computing device may also receive a history of activity from the second computing device. The history of activity may indicate activity on the second computing device, such as websites visited, content viewed, files accessed, software used, people contacted, or the like. The computing device may also display the history of activity in a report, which may emphasize at least a portion of the history of activity.

An additional computer-implemented method for temporarily adjusting administrator-control settings may comprise: 1) receiving a set of permissions for adjusting a set of administrator-control settings on a computing device, 2) identifying the set of administrator-control settings to be adjusted, 3) identifying a limiting condition for the set of permissions, 4) saving a base state of the set of administrator-control settings, 5) adjusting, based on the set of permissions, the set of administrator-control settings, and then 6) restoring the set of administrator-control settings to the base state when the limiting condition for the set of permissions is satisfied. In various embodiments, the limiting condition for the set of permissions may comprise a time limit for the set of permissions.

In at least one embodiment, the method may further comprise recording a history of activity until the administrator-control settings are restored. The history of activity may correspond to the activity on the computing device. In addition, the computing device may display the history of activity in a human-readable form, transmit the history of activity to an additional computing device, and/or save the history of activity to a storage device.

In one embodiment, a student may use the computing device, which receives the set of permissions from an additional computing device whereon a teacher generated the set of permissions. In another embodiment, an employee may use the computing device, which receives the set of permissions from an additional computing device whereon an information technology specialist generated the set of permissions.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for temporarily adjusting parental-control settings, at least a portion of the method being performed by a computing device comprising at least one processor, the computer-implemented method comprising:
    implementing parental-control software that comprises parental-control settings that control access to one or more features of a computing device used by a student, the parental-control software being configured to receive, from a school of the student, permissions for temporarily adjusting the parental-control settings in the parental-control software;
    authorizing a teacher of the student to temporarily adjust the parental-control settings;
    receiving, from the student's school, a set of permissions generated by the teacher of the student for temporarily adjusting a set of parental-control settings in the parental-control software from a base state to a temporary state, the temporary state being a state in which at least one restriction has been temporarily adjusted to enable the student to complete a school project associated with the set of permissions;
    receiving, with the set of permissions generated by the student's teacher, digital authentication that indicates that the set of permissions was generated by the student's teacher;
    using the digital authentication to verify that the set of permissions comes from a source authorized to temporarily change the parental-control settings;
    identifying the set of parental-control settings to be temporarily adjusted in the parental-control software implemented on the computing device used by the student;
    temporarily adjusting, based on the set of permissions generated by the student's teacher, the set of parental-control settings in the parental-control software from the base state to the temporary state to enable the student to complete the school project associated with the set of permissions;
    restoring the set of parental-control settings in the parental-control software to the base state.

2. The computer-implemented method of claim 1, wherein the set of permissions was generated on a remote computing device used by the student's teacher.

3. The computer-implemented method of claim 1, wherein temporarily adjusting the set of parental-control settings comprises at least one of:
    allowing the student access to previously restricted content;
    allowing the student to use a previously restricted software application;
    allowing communication between the computing device used by the student and at least one additional computing device.

4. The computer-implemented method of claim 1, wherein temporarily adjusting the set of parental-control settings comprises providing the student with extended privileges for using instant messaging.

5. The computer-implemented method of claim 1, wherein temporarily adjusting the set of parental-control settings on the computing device used by the student comprises at least one of:
    providing the student with additional time for using a restricted software application;
    providing the student with additional time for voice communications.

6. The computer-implemented method of claim 1, wherein temporarily adjusting the set of parental-control settings comprises:
    providing the student with additional time for accessing the internet.

7. The computer-implemented method of claim 1, further comprising, prior to temporarily adjusting the set of parental-control settings:
    saving the base state of the set of parental-control settings.

8. The computer-implemented method of claim 1, wherein the base state of the parental-control settings comprises a default state of the parental-control settings.

9. The computer-implemented method of claim 1, further comprising:
    identifying a limiting condition for the set of permissions;
    determining when the limiting condition is satisfied.

10. The computer-implemented method of claim 9, further comprising recording a history of the student's activity on the computing device used by the student until the limiting condition is satisfied.

11. The computer-implemented method of claim 10, further comprising at least one of:
    displaying the history of the student's activity in a human-readable form;
    transmitting the history of the student's activity to the student's school;
    saving the history of the student's activity to a storage device.

12. A computer-implemented method for distributing sets of permissions to adjust parental-control settings, at least a portion of the method being performed by a computing device comprising at least one processor, the computer-implemented method comprising:
    receiving, on a first computing device used by a teacher, permissions information associated with a school project assigned to at least one student of the teacher;
    generating, based on the permissions information associated with the school project assigned to the teacher's student, a set of permissions configured to temporarily adjust a set of parental-control settings in parental-control software implemented on a second computing device used by the teacher's student;
    authorizing the teacher to temporarily adjust the set of parental-control settings;
    sending the set of permissions to the second computing device used by the teacher's student to temporarily adjust the set of parental-control settings in the parental-control software from a base state to a temporary state, the temporary state being a state in which at least one restriction has been adjusted to enable the teacher's student to complete the school project with which the permissions information received from the teacher is associated;
    sending, with the set of permissions generated by the teacher, digital authentication that indicates that the set of permissions was generated by the teacher, wherein the digital authentication is used by the second computing device to verify that the set of permissions comes from a source authorized to temporarily change the set of parental-control settings.

13. The computer-implemented method of claim 12, wherein generating the set of permissions comprises including a software module with the set of permissions, the software module being programmed to use the set of permissions to temporarily adjust the set of parental-control settings on the second computing device used by the teacher's student.

14. The computer-implemented method of claim 12, wherein sending the set of permissions to the second computing device used by the teacher's student comprises sending a limiting condition for the set of permissions to the second computing device used by the teacher's student.

15. The computer-implemented method of claim 12, further comprising receiving, on the first computing device used by the teacher, a history of the student's activity from the second computing device used by the teacher's student.

16. A computer-implemented method for temporarily adjusting parental-control settings, at least a portion of the method being performed by a computing device comprising at least one processor, the computer-implemented method comprising:

implementing parental-control software that comprises parental-control settings that control access to one or more features of a computing device used by a student, the parental-control software being configured to receive, from a school of the student, permissions for temporarily adjusting the parental-control settings in the parental-control software;

authorizing a teacher of the student to temporarily adjust the parental-control settings;

receiving, from the student's school, a set of permissions generated by the teacher of the student for temporarily adjusting a set of parental-control settings in the parental-control software from a base state to a temporary state, the temporary state being a state in which at least one restriction has been temporarily adjusted to enable the student to complete a school project associated with the set of permissions;

receiving, with the set of permissions generated by the student's teacher, digital authentication that indicates that the set of permissions was generated by the student's teacher;

using the digital authentication to verify that the set of permissions comes from a source authorized to temporarily change the parental-control settings;

identifying a limiting condition established by the student's teacher for the set of permissions;

identifying the set of parental-control settings to be temporarily adjusted in the parental-control software implemented on the computing device used by the student;

saving the base state of the set of parental-control settings implemented on the computing device used by the student;

temporarily adjusting, based on the set of permissions generated by the student's teacher, the set of parental-control settings in the parental-control software from the base state to the temporary state to enable the student to complete the school project associated with the set of permissions;

restoring the set of parental-control settings in the parental-control software implemented on the computing device used by the student to the base state when the limiting condition for the set of permissions is satisfied.

17. The computer-implemented method of claim 16, further comprising at least one of:

recording a history of activity until the set of parental-control settings are restored to the base state, the history of activity detailing activity on the computing device used by the student;

displaying the history of activity in a report on the computing device used by the student;

transmitting the history of activity to a computing device used by the student's teacher;

saving the history of activity to a storage device.

18. The computer-implemented method of claim 16, wherein the set of permissions was generated on an additional computing device used by the student's teacher.

\* \* \* \* \*